(12) United States Patent
Van Mill et al.

(10) Patent No.: US 6,281,441 B1
(45) Date of Patent: Aug. 28, 2001

(54) RETRACTABLE SYSTEM FOR ELECTRICAL HARNESS WIRE

(75) Inventors: Michael D. Van Mill, Shell Rock; Philip J. Kenkel, Cedar Falls, both of IA (US)

(73) Assignee: Unverferth Manufacturing Co., Inc., Kalida, OH (US)

( * ) Notice: Subject to any disclaimer, the term of this patent is extended or adjusted under 35 U.S.C. 154(b) by 0 days.

(21) Appl. No.: 09/399,100

(22) Filed: Sep. 20, 1999

Related U.S. Application Data

(60) Provisional application No. 60/101,950, filed on Sep. 25, 1998.

(51) Int. Cl.[7] .............................. H01B 7/06; H01R 11/00; B65G 1/00
(52) U.S. Cl. .............................. 174/69; 439/503; 414/563
(58) Field of Search ....................................... 174/69, 77 R, 174/135, 52.01; 439/501, 503; 414/480, 482, 483, 500, 563; 280/401, 402, 490, 789

(56) References Cited

U.S. PATENT DOCUMENTS

| | | | | |
|---|---|---|---|---|
| 4,337,596 | * | 7/1982 | Kern et al. .............................. | 49/210 |
| 4,968,210 | * | 11/1990 | Friederich .............................. | 414/485 |
| 6,203,264 | * | 3/2001 | Combs, Sr. ........................... | 414/483 |

\* cited by examiner

*Primary Examiner*—Rajnikant B. Patel
(74) *Attorney, Agent, or Firm*—Rothwell, Figg, Ernst & Manbeck

(57) ABSTRACT

A retractable harness system for an electrical wire having a slidable harness wire pulley, an elastic cord pulley, and an elastic cord. The slidable harness wire pulley places a rearward tension on the harness wire while allowing the harness wire to be extended and retracted from the front portion of an elongate support member. A clamp is provided capable of clamping the harness wire in fixed relation to the elongate support member, and capable of being released to allow extension and retraction of the harness wire.

9 Claims, 6 Drawing Sheets

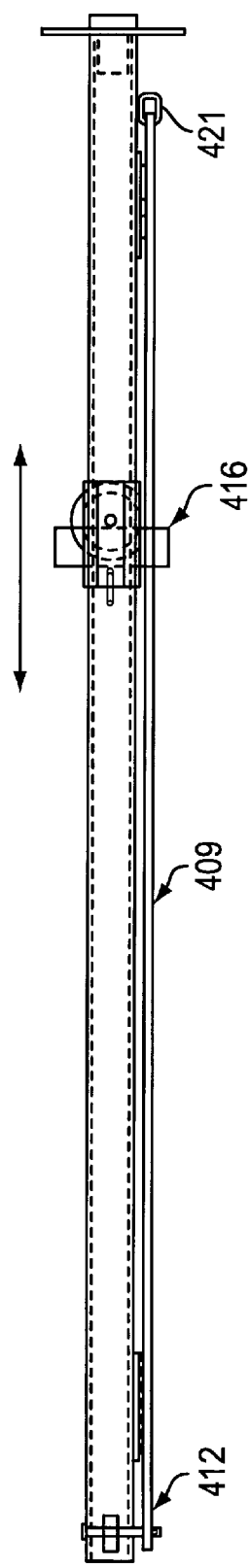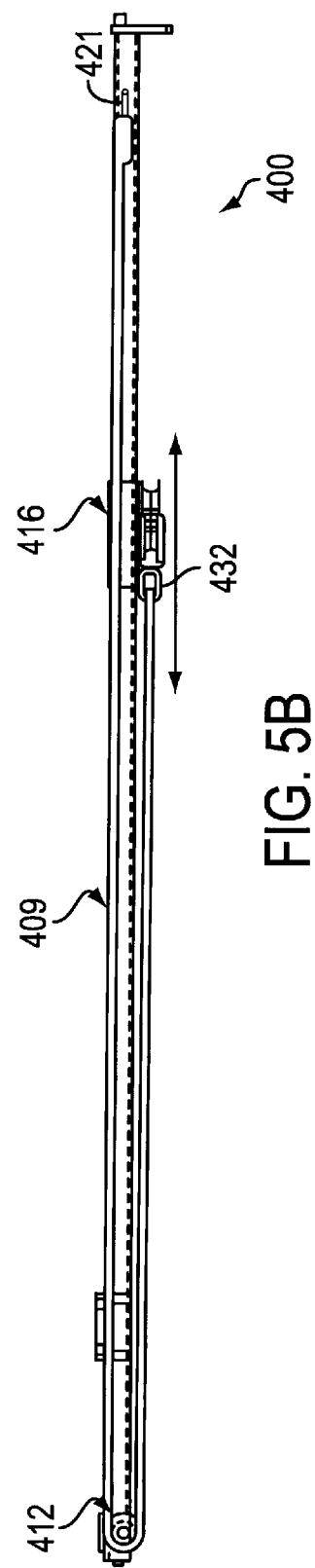
FIG. 5A
FIG. 5B

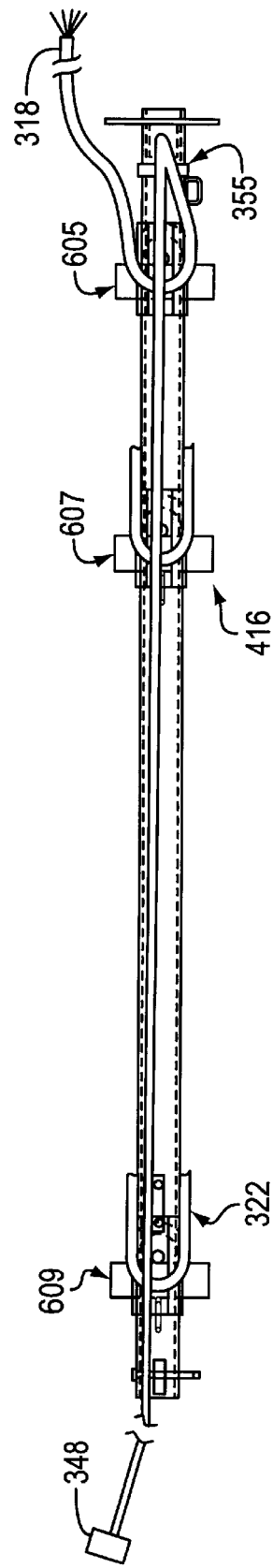
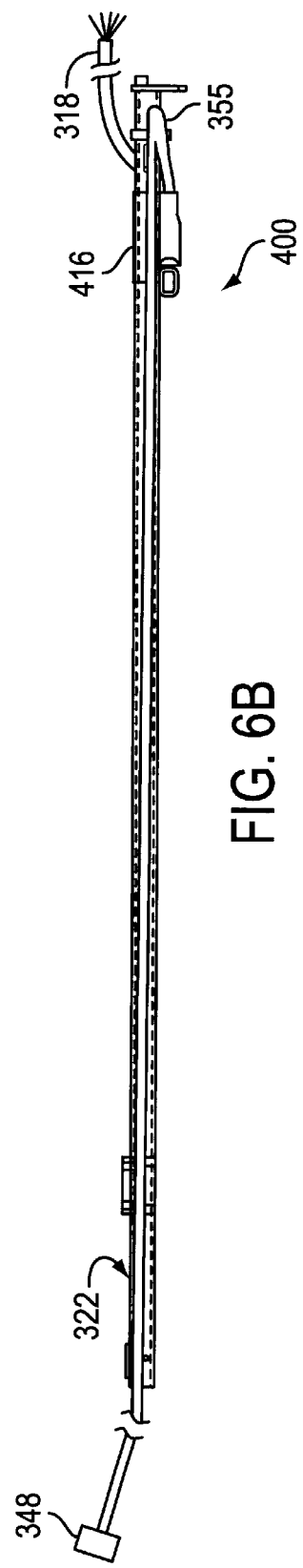
FIG. 6A
FIG. 6B

RETRACTABLE SYSTEM FOR ELECTRICAL HARNESS WIRE

CROSS-REFERENCE TO RELATED APPLICATION

The present application claims priority from, and the benefit of the filing date of, U.S. Provisional application Ser. No. 60/101,950, filed Sep. 25, 1998.

BACKGROUND OF THE INVENTION

1. Field of the Invention

The present invention relates to the field of systems for electrical harness wires.

2. Description of the Background Art

Many auxiliary devices and vehicles such as wagons and the like have electrical systems with an electrical harness for connecting to a source of electricity. With towable wagons, the electrical harness can extend along the tongue, so that a towing vehicle may be electrically connected to the wagon for the purposes of operating lights, brakes, control functions, etc., on the wagon.

There remains a need in the art for improved systems for electrical harness wires.

SUMMARY OF THE INVENTION

In accordance with the present invention, disclosed is a retractable system for a harness wire which comprises a slidable harness wire pulley affixed to an elongate support member, and capable of sliding in relation to the elongated support member. It includes an elastic cord pulley fixed to a front portion of the elongate support member, and an elastic cord having a first end fixed to the front portion of the elongate support member, a second end fixed to the slidable harness wire pulley, and having a first length extending from the front portion of the elongate support member to the elastic cord pulley, passing around the elastic cord pulley, with a second length extending between the elastic cord pulley and the slidable harness wire pulley, wherein the elastic cord urges the slidable harness wire pulley toward the rear portion of the elongate support member. A harness wire is provided, which has a first length extending from the rear portion of the elongate support member to the front portion of the elongate support member, and being fixed to the front portion of the elongate support member, having a second length extending from the front portion of the elongate support member to the slidable harness wire pulley, passing around the slidable harness wire pulley, and having a third length extending from the slidable harness wire pulley to the front portion of the elongate support member. The slidable harness wire pulley places a rearward tension on the harness wire while allowing the harness wire to be extended and retracted from the front portion of the elongate support member. A clamp is provided, capable of clamping the harness wire in fixed relation to the elongate support member, and capable of being released to allow extension and retraction of the harness wire.

BRIEF DESCRIPTION OF THE DRAWINGS

FIGS. 5A and 5B are elevational views of the elastic cord apparatus of the retractable harness wire in accordance with one embodiment of the present invention;

FIGS. 6A and 6B are elevational views of the wiring harness apparatus of the retractable harness wire.

DETAILED DESCRIPTION OF THE PREFERRED EMBODIMENTS

The present invention relates to a retractable system for an electrical harness wire. The invention may be utilized in many auxiliary devices having electrical systems which need to be connected to a source of electricity by an electrical harness wire. As one example, the invention may be utilized with a towable wagon having electrically operable electrical systems such as lights, brakes, control functions and the like, with an electrical harness wire for connecting to the electrical system of a vehicle which tows the wagon.

Figure 1:
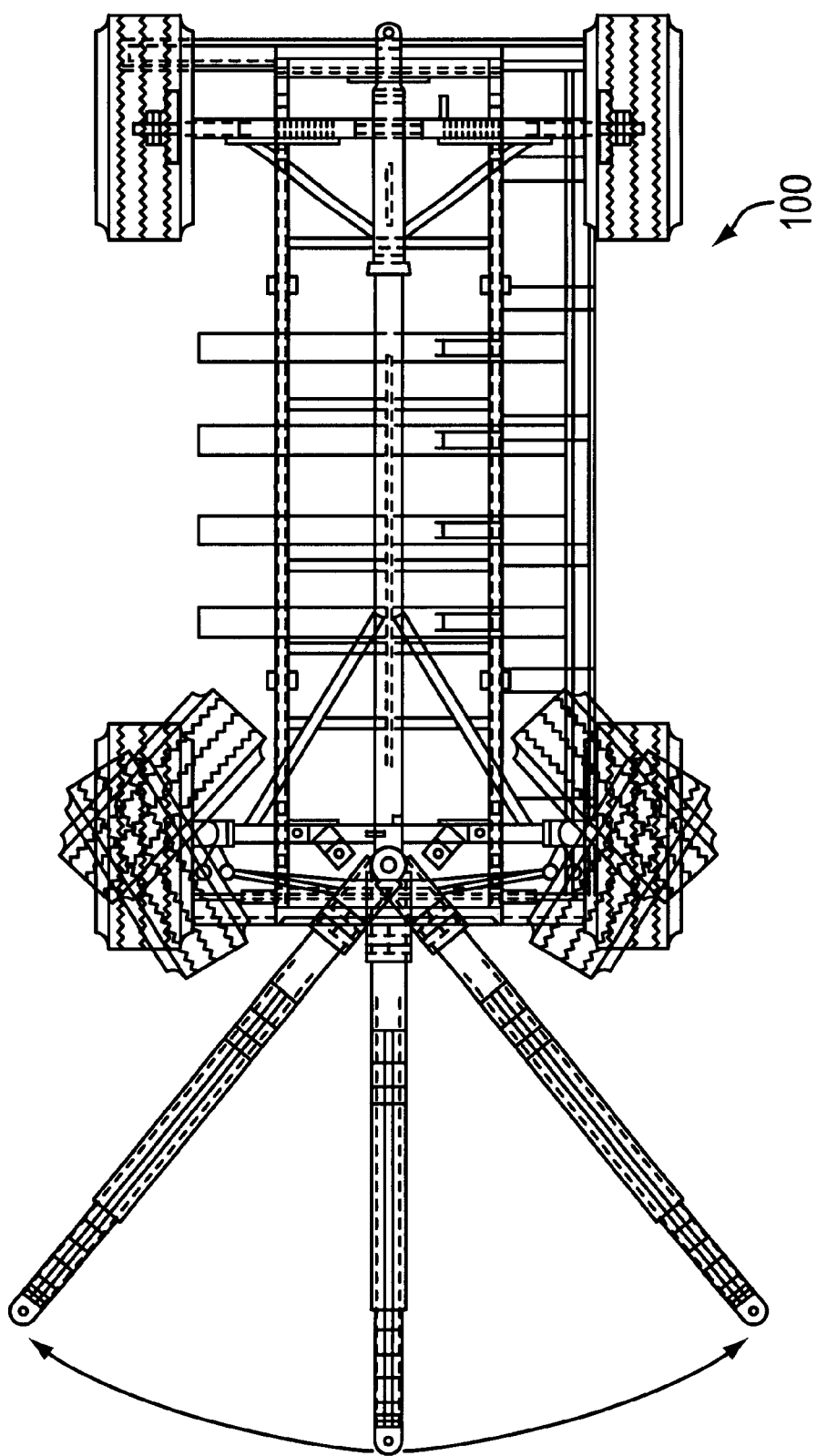
FIG. 1 is a top elevational view of a wagon to which one embodiment of the present invention is applicable.

FIG. 1 shows a wagon 100 to which the present invention is applicable. Although the invention is further described herein with respect to its utilization in a wagon, it is to be understood that the invention is applicable to other devices having electrical harness wires for connecting to a source of electricity.

Figure 3:
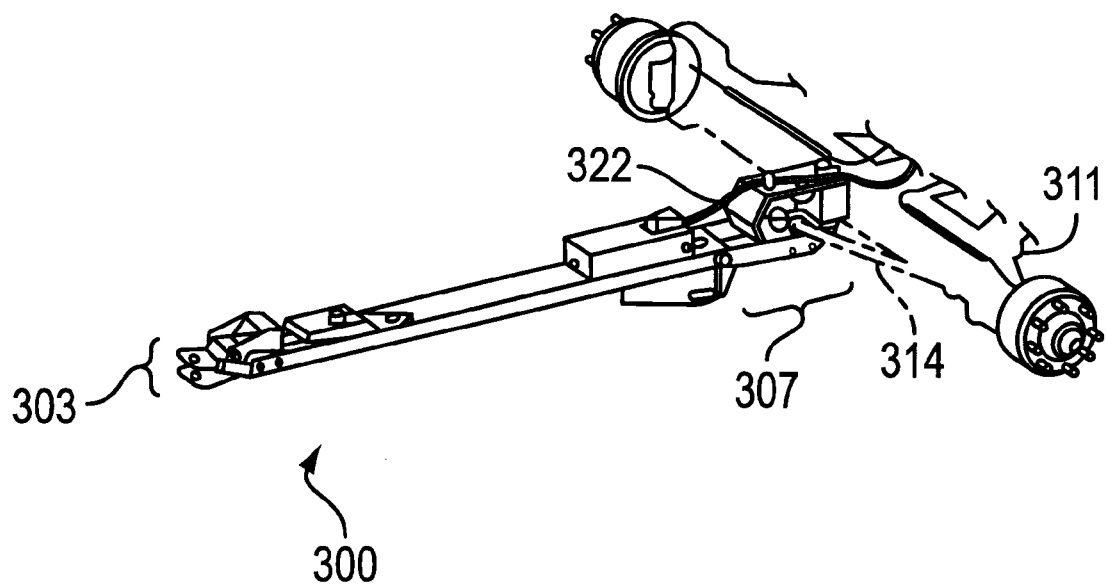
FIG. 3 is a perspective view of an embodiment of a wagon tongue with a retractable harness wire system in accordance with one embodiment of the present invention.

FIG. 3 shows an elongate support member in the form of a wagon tongue 300 in accordance with one embodiment of the present invention. The tongue 300 has a front portion 303 for connecting the wagon 200 to a vehicle (not shown), and a rear portion 307 for connecting the tongue 300 to a wagon frame 311 and steering linkage 314 of the wagon 200. The tongue 300 also includes a wiring harness 322 for electrically connecting the wagon 200 to the vehicle.

Figure 4:
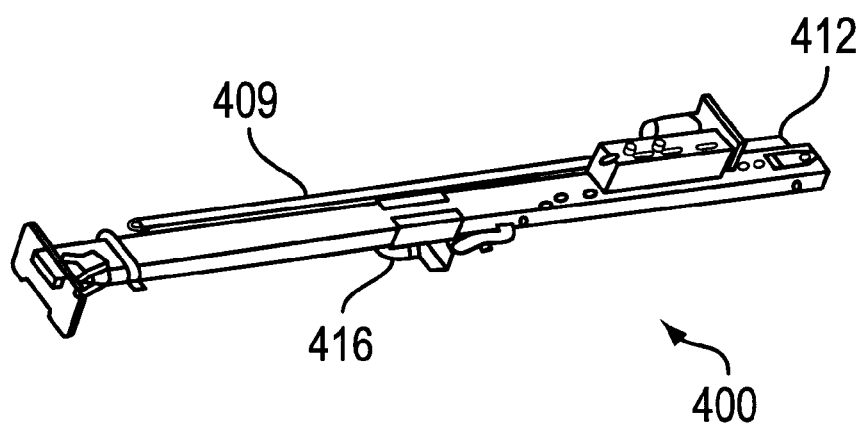
FIG. 4 is a perspective view of an internal tongue tube contained within the tongue of FIG. 3.

FIG. 4 shows a tongue tube 400 which fits inside the tongue 300. The tongue tube 400 includes several components which operate to retract and extend the wiring harness 322 from the front portion 303 of the tongue 300. The tongue tube 400 includes an elastic cord 409, an elastic cord pulley 412, and a slidable harness wire pulley 416.

FIGS. 5A and 5B show top and side views of the tongue tube 400, illustrating details of the elastic cord arrangement. The elastic cord 409 is fixed at a first end at a stationary attachment point 421. The elastic cord 409 extends from the stationary attachment point 421 up to and around the elastic cord pulley 412 and back to the slidable harness wire pulley 416, where the elastic cord 409 is attached to attachment point 432.

In operation, the elastic cord 409 opposes a forward motion of the slidable harness wire pulley 416 toward the front of the tongue tube 400. In a preferred embodiment, the elastic cord 409 is a rubber bungee cord, but alternatively may be a spring or other elastic device.

FIGS. 6A and 6B show top and side views of the tongue tube 400, illustrating details of the retractable wiring harness arrangement. The harness wire 322 extends from a rear connector 348 to a front end 318 and a front connector (not shown). The wiring harness 322 is of a length greater than needed to extend the length of the tongue 300, with excess length being contained in the tongue. In the preferred embodiment, the rear portion of the wiring harness 322 includes a mating connector pair (including rear connector 348) whereby the harness section contained within the tongue 300 may be easily replaced. In a lesser preferred embodiment, the rear portion of the wiring harness 322 does not include a mating connector pair. The harness wire 322 is held at the front of the tongue 300 by a spring clamp 355, and then passes around the slidable harness wire pulley 416 before leaving the tongue tube 400 at the front of the tongue 300.

In operation, the slidable harness wire pulley 416 is biased in a rearward direction by the elastic cord 409. The slidable harness wire pulley 416 therefore exerts a retracting force on the wiring harness 322. During retraction of the wiring harness 322, the slidable harness wire pulley 416 is allowed to move to the rear of the tongue tube 300, such as shown at position 609 of FIG. 6A. During extension of the wiring harness 322, the slidable harness wire pulley 416 is pulled to the front of the tongue tube 300, such as shown at positions 607 and 605 of FIG. 6A, thereby allowing more of the wiring harness 322 to extend from the tongue tube 400 and the tongue 300.

Figure 7A:
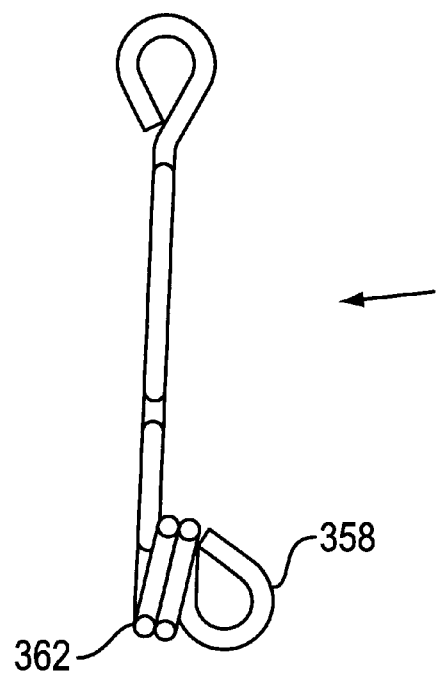
FIGS. 7A and 7B are elevational views of a spring clamp for fixing the extended length of the harness wire.
Figure 7B:
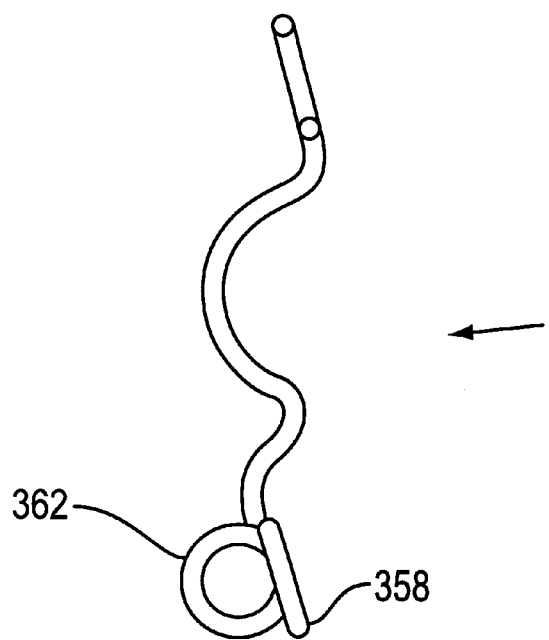

FIGS. 7A and 7B show two views of a spring clamp 355 used to fix the length of the portion of the wiring harness 322 extending from the front of the tongue 300. In the preferred embodiment, the spring clamp 355 is formed of an iron or steel rod, or a suitable substitute thereof. The rod may be between approximately one-eighth and three-quarters of an inch in diameter, and preferably is of a spring-like material. The coils 362 contribute to the spring-like characteristics. The loop 358 provides a hole through which a bolt or other fastener may be used to attach the spring clamp 355 to the tongue 300.

Figure 2:
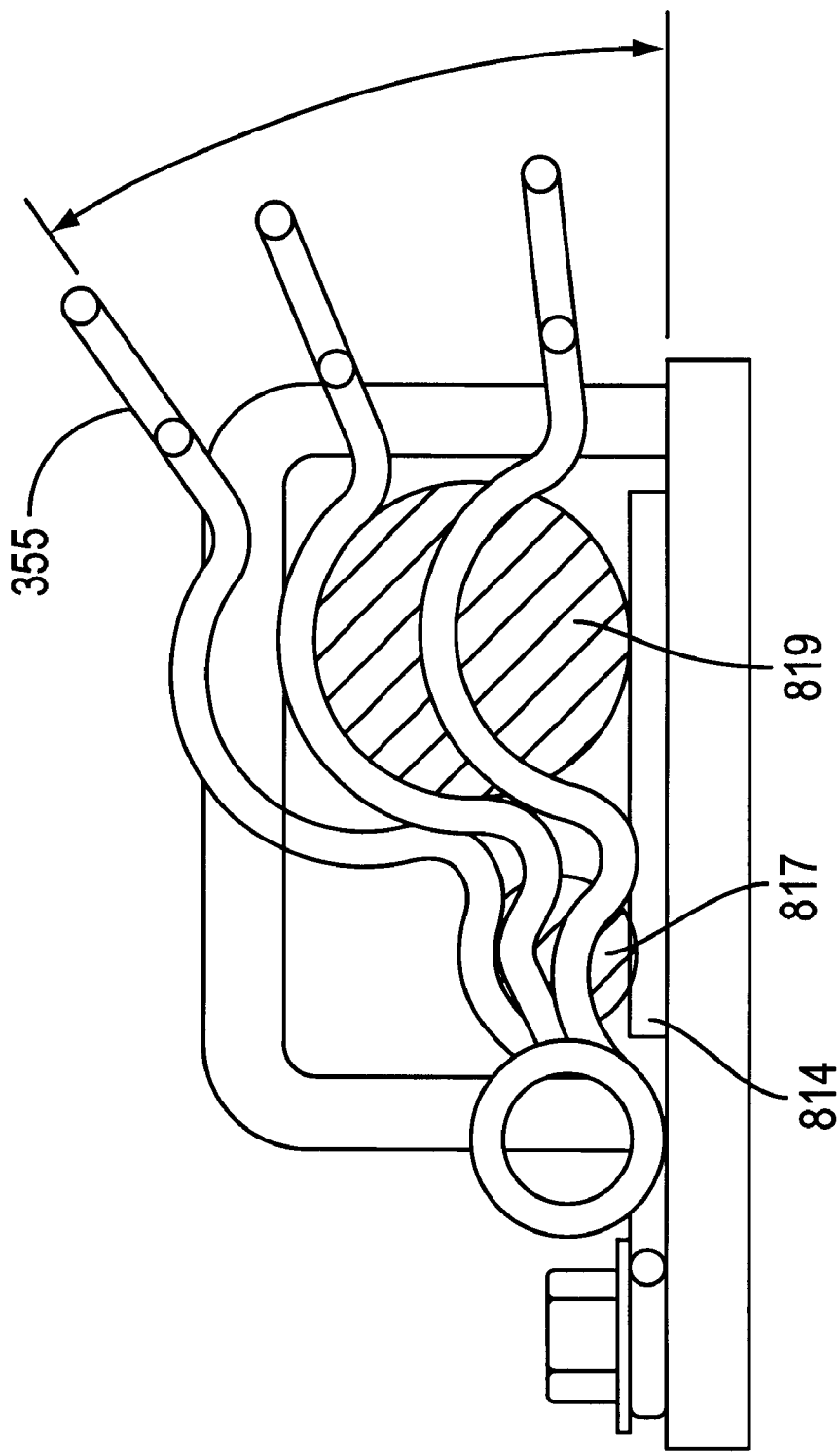
FIG. 2 is an elevational view of the operation of a spring clamp which may be used in an embodiment of the invention.

FIG. 2 shows the spring clamp 355 in use. A wire harness, such as 817 or 819, is pinned by the spring force of the spring clamp 355. A soft pad 814, such as, for example rubber, may be positioned below the claiming region of the spring clamp 355. In use, the spring clamp 355 may be lifted in opposition to the spring force, the wire harness 817 or 819 may be moved, and the spring clamp 355 may be released in order to hold the wire harness 817 or 819 in position.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A retractable system for a harness wire comprising:

a slidable harness wire pulley affixed to an elongate support member, and capable of sliding in relation to said elongate support member;

an elastic cord pulley fixed to a front portion of said elongate support member;

an elastic cord having a first end fixed to said front portion of said elongate support member and having a second end fixed to said slidable harness wire pulley, and having a first length extending from said front portion of said elongate support member to said elastic cord pulley, passing around said elastic cord pulley, and having a second length extending between said elastic cord pulley and said slidable harness wire pulley, wherein said elastic cord urges said slidable harness wire pulley toward said rear portion of said elongate support member;

a harness wire, having a first length extending from said rear portion of said elongate support member to said front portion of said elongate support member, and being fixed to said front portion of said elongate support member, having a second length extending from said front portion of said elongate support member to said slidable harness wire pulley, passing around said slidable harness wire pulley, and having a third length extending from said slidable harness wire pulley to said front portion of said elongate support member, wherein said slidable harness wire pulley places a rearward tension on said harness wire while allowing said harness wire to be extended and retracted from said front portion of said elongate support member; and a clamp capable of clamping said harness wire in fixed relation to said elongate support member, and capable of being released to allow extension and retraction of said harness wire.

2. A system of claim 1 wherein said elongate support member is comprised of a tube portion.

3. The system of claim 2, wherein said slidable harness wire pulley slides on an outside surface of the tube portion of said elongate support member.

4. The system of claim 1, wherein said clamp is a spring that normally rests against a surface of said elongate support member.

5. The system of claim 1, wherein said harness wire has a connector at a front end of said harness wire corresponding to a front portion of said elongate support member, and capable of connecting to a vehicle electrical system.

6. The system of claim 1, wherein said harness wire has a connector at a front end and a connector at rear end of said harness wire so that said harness wire may be replaced.

7. The system of claim 1, wherein said elastic cord is a rubber bungee cord.

8. The system of claim 1, further comprising a wagon including at least one pair of steerable wheels, wherein said elongate support member comprises a tongue of said wagon, said tongue connected to said steerable wheels for steering said steerable wheels.

9. The system of claim 8, wherein said harness wire has a connector at a front end of said harness wire corresponding to a front portion of said tongue, and capable of connecting to a vehicle electrical system.

* * * * *